United States Patent
Usuda et al.

(10) Patent No.: US 8,139,523 B2
(45) Date of Patent: Mar. 20, 2012

(54) MOBILE COMMUNICATION SYSTEM, MOBILE STATION, AND RADIO BASE STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 893 days.

(21) Appl. No.: 11/667,269

(22) PCT Filed: Nov. 10, 2005

(86) PCT No.: PCT/JP2005/020629
§ 371 (c)(1),
(2), (4) Date: Aug. 14, 2007

(87) PCT Pub. No.: WO2006/051867
PCT Pub. Date: May 18, 2006

(65) Prior Publication Data
US 2009/0069017 A1    Mar. 12, 2009

(30) Foreign Application Priority Data
Nov. 10, 2004  (JP) ................ P2004-327124

(51) Int. Cl.
*H04Q 7/00* (2006.01)
(52) U.S. Cl. ......................... 370/328; 370/252
(58) Field of Classification Search .......... 370/252, 370/328, 331, 338, 401; 455/436, 437, 438, 455/439, 442; 375/436, 437, 438, 439, 442
See application file for complete search history.

(56) References Cited

U.S. PATENT DOCUMENTS

| | | | |
|---|---|---|---|
| 6,496,543 B1 * | 12/2002 | Zehavi | 375/295 |
| 6,879,840 B2 * | 4/2005 | Razavilar et al. | 455/522 |
| 7,190,964 B2 * | 3/2007 | Damnjanovic et al. | 455/522 |
| 7,266,107 B2 * | 9/2007 | Choi et al. | 370/341 |
| 7,369,501 B2 * | 5/2008 | Kim et al. | 370/235 |
| 7,376,429 B2 * | 5/2008 | Choukroun et al. | 455/456.1 |
| 7,477,625 B2 * | 1/2009 | Kang | 370/331 |
| 7,493,132 B2 * | 2/2009 | Malladi et al. | 455/522 |

(Continued)

FOREIGN PATENT DOCUMENTS

JP    2001-189693 A    7/2001

(Continued)

OTHER PUBLICATIONS

NTT DoCoMo, "E-DCH Handover:SHO for E-DCH and HHO for DPCH", 3GPP TSG-RAN Working Group 1, Nov. 15-19, 2004, Shin-Yokohama, Japan.

(Continued)

*Primary Examiner* — Ricky Ngo
*Assistant Examiner* — Christine Ng
(74) *Attorney, Agent, or Firm* — Marvin A. Motsenbocker; Mots Law, PLLC (57) ABSTRACT

When an HSDPA and an Enhanced Uplink are applied, a dedicated physical channel, a high speed dedicated physical control channel, and an enhanced dedicated physical control channel are made to follow only a TPC bit of a serving cell; and when a received power of an enhanced dedicated physical data channel is large, a non-serving cell instructs a mobile station UE to reduce the transmission rate of the enhanced dedicated physical data channel so that an interference power from an adjacent cell in an uplink is controlled while communication quality in a downlink is prevented from deteriorating.

15 Claims, 9 Drawing Sheets

U.S. PATENT DOCUMENTS

| | | | |
|---|---|---|---|
| 7,583,633 B2 * | 9/2009 | Woo et al. | 370/331 |
| 2003/0219037 A1 | 11/2003 | Toskala et al. | |
| 2004/0219920 A1 | 11/2004 | Love et al. | |
| 2005/0159176 A1 * | 7/2005 | Uehara et al. | 455/522 |

FOREIGN PATENT DOCUMENTS

| | | |
|---|---|---|
| JP | 2003-143638 A | 5/2003 |
| JP | 2004-080529 A | 3/2004 |
| WO | WO 2004/075473 A1 | 9/2004 |

OTHER PUBLICATIONS

3rd Generation Partnership Project; Technical Specification Group Radio Access Network; Feasibility Study for Enhanced Uplink for UTRA FDD (Release 6), Mar. 2004 3GPP TR 25.896 V6.0.0 (Mar. 2004), p. 1-p. 179.

* cited by examiner

MOBILE COMMUNICATION SYSTEM, MOBILE STATION, AND RADIO BASE STATION

TECHNICAL FIELD

The present invention relates to a mobile communication system, a mobile station and a radio base station. In particular, the present invention relates to a mobile communication system, a mobile station, and a radio base station to which a third generation communication system such as a "W-CDMA" system or a "CDMA2000" system is applied.

BACKGROUND ART

A high speed shared packet channel is known in which, in a downlink of a mobile communication system, a radio base station Node B is configured to perform a scheduling process, an adaptive modulation and coding process, and a HARQ (hybrid ARQ (Auto Repeat reQuest)) retransmission control process.

For example, in the 3GPP, the "HSDPA (High Speed Downlink Packet Access)" is standardized as a mobile communication system using such a high speed shared packet channel.

Figure 1:
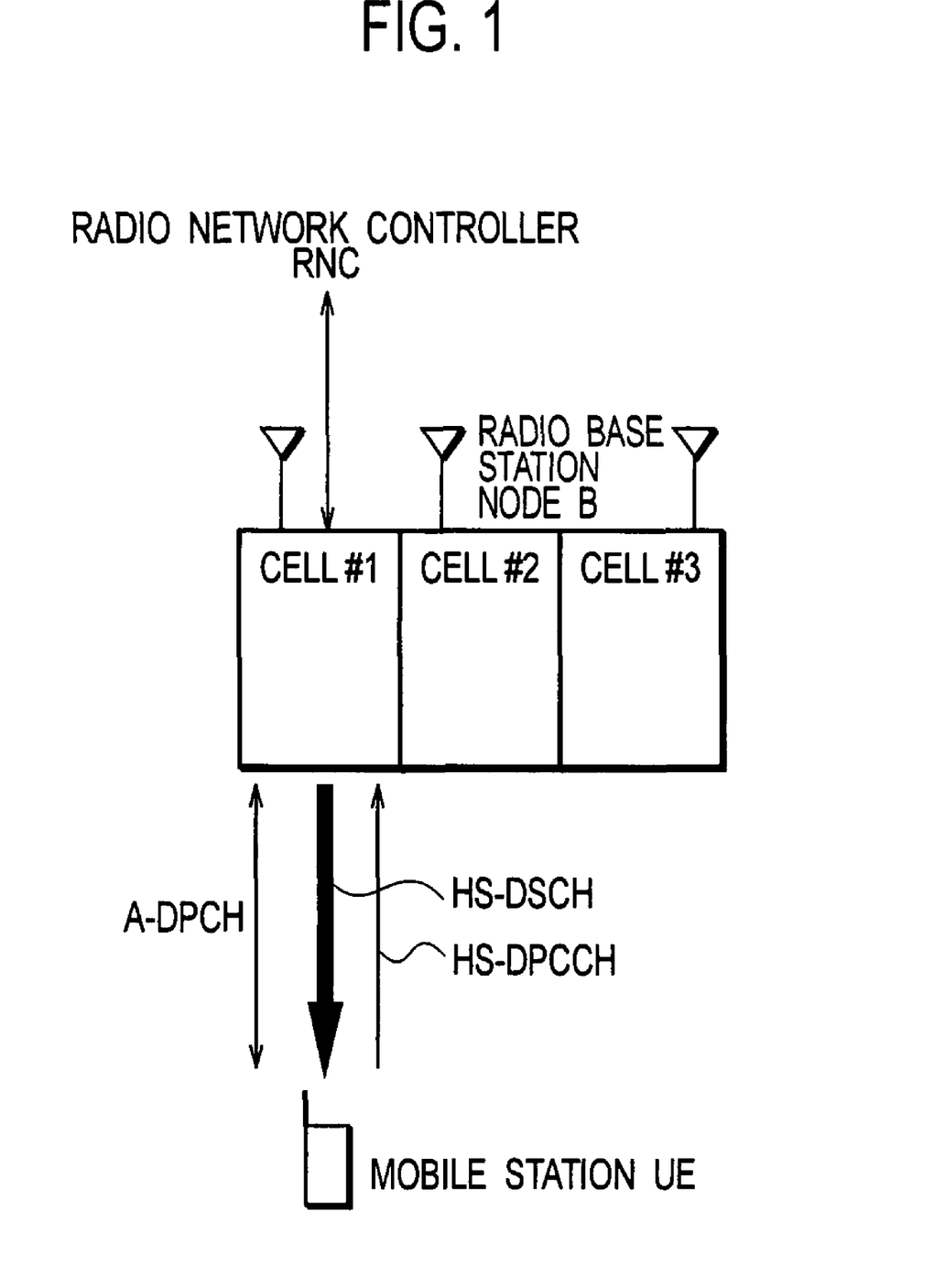
FIG. 1 is a diagram showing a connection configuration of a high speed shared packet channel of a conventional mobile communication system.

FIG. 1 is a diagram showing a connection configuration of channels in a mobile communication system using the HSDPA.

A high speed downlink shared channel (HS-DSCH) is a shared channel used for transmitting user data in a downlink of a mobile communication system to which the HSDPA is applied.

An associated dedicated physical channel (A-DPCH) is a dedicated channel associated with the high speed downlink shared channel (HS-DSCH). An associated dedicated physical channel (A-DPCH) for an uplink and the associated dedicated physical channel (A-DPCH) for a downlink form a pair.

The associated dedicated physical channel (A-DPCH) for downlink is configured to transmit transmission power control information (TPC command) on a downlink for controlling a transmission power for an uplink, a layer 3 control signal from a radio network controller RNC, and the like.

The associated dedicated physical channel (A-DPCH) for uplink is configured to transmit user data, a layer 3 control signal to the radio network controller RNC, and the like.

A high speed dedicated physical control channel (HS-DPCCH) is a dedicated physical channel which is used for transmitting a transmission acknowledgement signal (Ack/Nack) of the high speed downlink shared channel (HS-DSCH) and a downlink channel quality indicator (CQI) in an uplink.

The high speed dedicated physical control channel (HS-DPCCH) has a predetermined transmission power offset relative to the associated dedicated physical channel (A-DPCH) for an uplink. In addition, a closed loop transmission power control process is performed on the associated dedicated physical channel (A-DPCH) for an uplink to secure a predetermined receiving quality at a radio base station Node B.

Unlike a mobile communication system of the conventional CDMA system, a hard handover process is performed on the high speed downlink shared channel (HS-DSCH) used in the HSDPA. In contrast, a soft handover process can be performed on the associated dedicated physical channel (A-DPCH) which is transmitted/received in association to the high speed downlink shared channel (HS-DSCH).

In the soft handover process, when performing a transmission power control in an uplink, a mobile station may sometimes receive different transmission power control information (TPC commands) from different cells in a downlink. Since it is sufficient that each channel satisfy a required receiving quality at any one of the cells, the mobile station is configured to decrease the transmission power when at least one of two or more of the received transmission power control information (TPC commands) has a "command (Down command) indicating that the transmission power is to be decreased".

In a mobile communication system of the CDMA system, there is a problem in general that, unless the soft handover process is performed in an uplink, an interference power from an adjacent cell becomes large that the communication capacity for the uplink is reduced.

Figure 2:
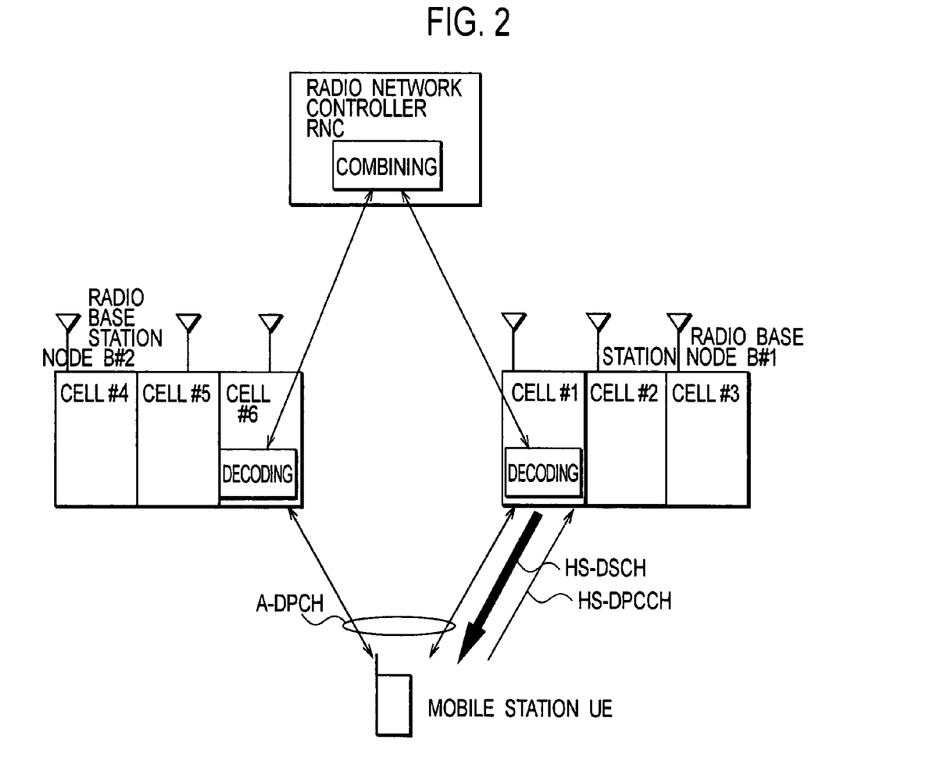
FIG. 2 is a diagram showing a connection configuration of the high speed shared packet channel of the conventional mobile communication system.

FIG. 2 is a diagram showing an example of a mobile communication system employing the HSDPA on which a soft handover process is performed, on an associated dedicated physical channel (A-DPCH).

As shown in FIG. 2, the mobile station UE transmits a high speed dedicated physical control channel (HS-DPCCH) in an uplink, so that the communication quality in a downlink, a transmission acknowledgement signal of the HARQ, and the like are transmitted.

Here, the high speed dedicated physical control channel (HS-DPCCH) has a transmission power offset (gain factor) relative to the dedicated physical control channel (DPCCH) which is one kind of the associated dedicated physical channel (A-DPCH).

In addition, a selective combining is performed on the associated dedicated physical channel (A-DPCH), on which a soft handover process is performed, in a radio network controller RNC. Here, an important factor is the communication quality of a dedicated physical control channel (DPCCH) in an uplink.

To be more precise, in FIG. 1, a transmission power control process is performed on the associated dedicated physical channel (A-DPCH) so that the receiving quality of a cell #1 would be constant. Accordingly, a receiving quality in the cell #1 can also be maintained fixed on the high speed dedicated physical control channel (HS-DPCCH) transmitted with a transmission power obtained by adding a fixed transmission power offset to the transmission power of associated dedicated physical channel (A-DPCH).

However, the receiving quality of the associated dedicated physical channel (A-DPCH) in the cell #1 is lower when the soft handover process is performed than when the soft handover process is not performed. This is because the transmission power control process of the Associated Dedicated Physical Channel (A-DPCH) is performed, at a time when the soft handover is performed, so that the receiving quality of a channel on which a selective combining is performed in the radio network controller RNC becomes constant. In addition, since the associated dedicated physical channel (A-DPCH) does not only follow the receiving quality in the cell #1, the receiving quality of the high speed dedicated physical control channel (HS-DPCCH) in the cell #1 varies with time.

Accordingly, the conventional mobile communication system is normally configured to transmit a high speed dedicated physical control channel (HS-DPCCH) with a larger transmission power offset added thereto when a soft handover process is performed than when a soft handover process is not performed.

However, sometimes it is not realistic to instantaneously increase a transmission power, from the aspect of cost and size, since the performance of a power amplifier of a mobile station UE needs to be enhanced. In such a case, a method is employed where a constant communication quality is satisfied in the high speed dedicated physical control channel (HS-DPCCH), by repeatedly transmitting transmission acknowledgement signals (Ack/Nack) or CQI.

However, there has been a problem that, with such a method, a communication capacity of an uplink is greatly affected by increasing the transmission power of the high speed dedicated physical control channel (HS-DPCCH) and transmitting the high speed dedicated physical control channel (HS-DPCCH) for a long period of time.

Further, there has been a problem that, while repetitive transmission is performed in the high speed dedicated physical control channel (HS-DPCCH), a downlink is not capable of receiving new data during the repetitive transmission, so that the maximum user throughput largely drops in the downlink.

Still further, there has been a problem that, in the case where a closed loop transmission diversity is applied to a channel of a downlink, deterioration in the receiving quality of the Feed Back Information (FBI) in an uplink prohibits a gain of a transmission diversity from being acquired and increases the probability of error in antenna verification, thereby decreasing the throughput of a downlink.

Meanwhile, with regard to an uplink, in the "3GPP" and the "3GPP2" which are international standardizations for the third generation communication system, a method of controlling high-speed radio resources of layer 1 and MAC sub-layer (layer 2) between a radio base station Node B and a mobile station UE have been studied. Such a study or function having been studied are, hereinafter, collectively referred to as an "Enhanced Uplink (EUL)".

In the Enhanced Uplink, in lower layers (layer 1 and layer 2), each cell of a radio base station Node B controls the transmission rate of a channel to be used for communication in an uplink at a high speed, so that the throughput of each cell can be increased.

Figure 3:
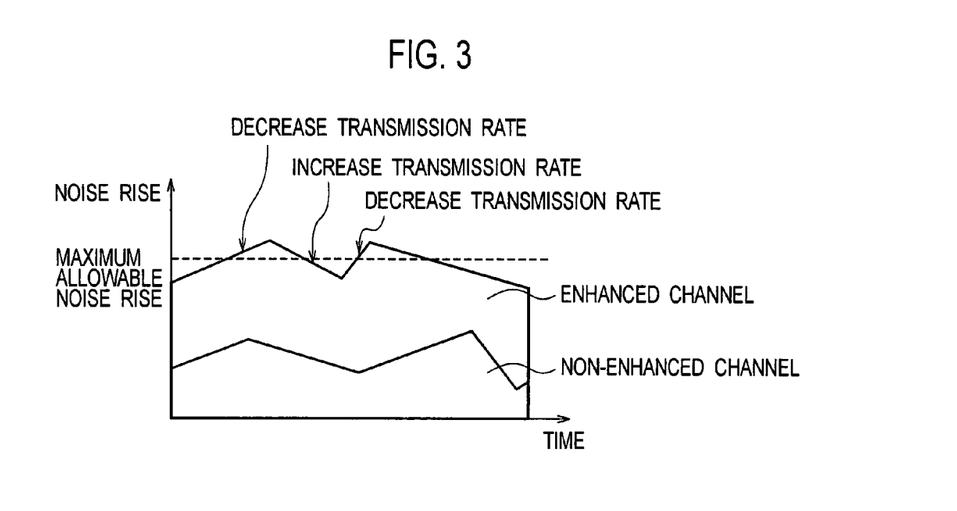
FIG. 3 is a diagram for describing operation at a time when controlling a transmission rate of a channel of an uplink of the conventional mobile communication system.

To be more precise, as shown in FIG. 3, each cell of the radio base station Node B is configured to measure a "noise rise" of a channel used for communication in an uplink, and to sequentially control the transmission rate of the channel so that the noise rise of the channel converges on a level close to the maximum allowable noise rise.

Here, the noise rise is a ratio between an interference power of a predetermined channel in a predetermined frequency and a noise power (a thermal noise power or a noise power from outside the mobile communication system) in the predetermined frequency. In other words, the noise rise is an offset that a receiving level in a communication state holds compared to a receiving level (noise floor) in a non-communication state.

Incidentally, in the present application, a channel to which the Enhanced Uplink is applied is referred to as an enhanced channel (for example, a dedicated channel to which the Enhanced Uplink is applied is referred to as an "enhanced dedicated channel").

Figure 4:
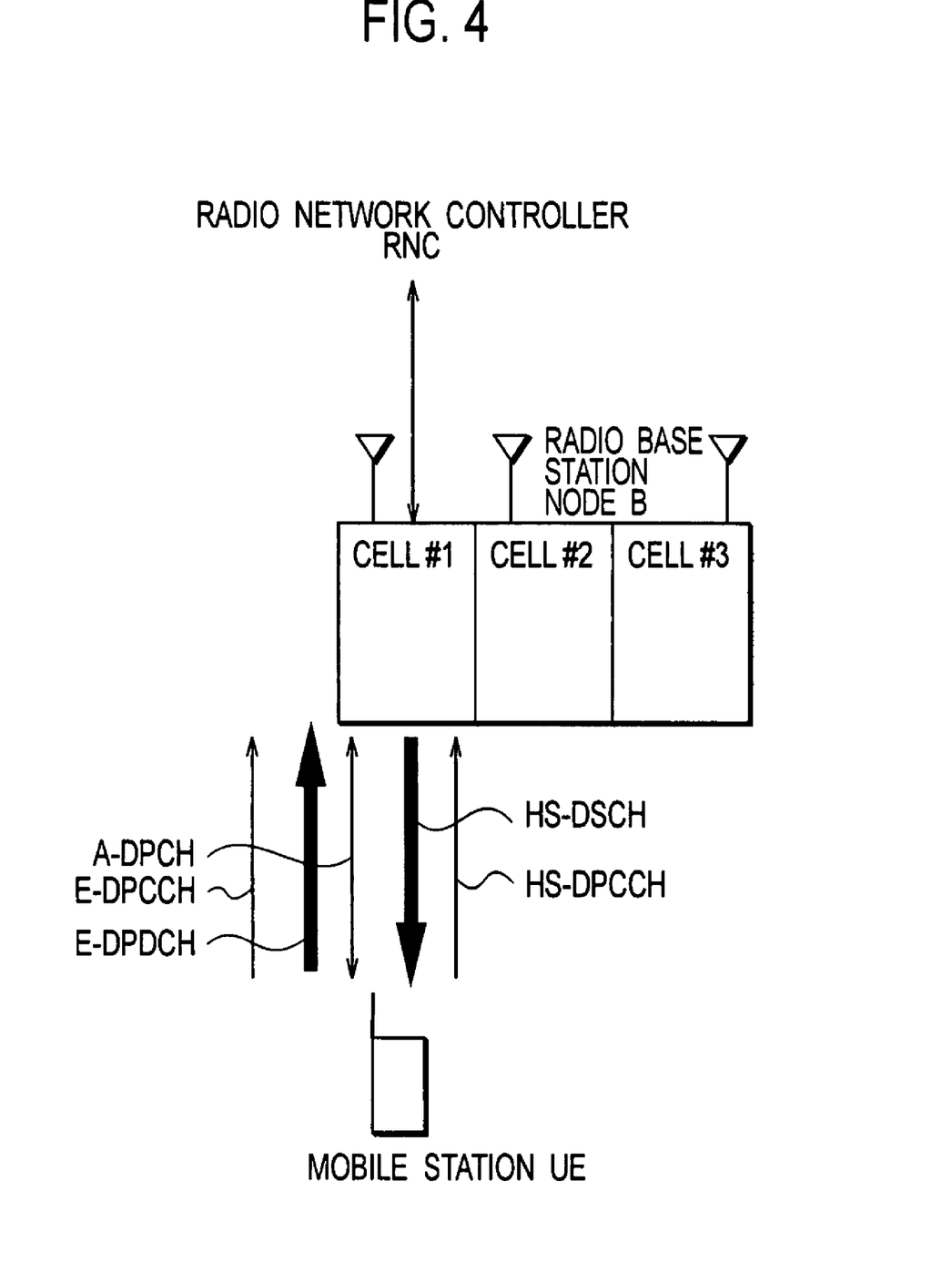
FIG. 4 is a diagram showing a connection configuration of the high speed shared packet channel and an enhanced dedicated physical channel of the conventional mobile communication system.

Also in a mobile communication system to which the Enhanced Uplink is applied, a serving cell (uplink serving cell) mainly performing a scheduling process, a transmission rate control process and the like, is defined. In addition, the uplink serving cell transmits an instruction (Rate Grant) to a serving mobile station UE so as to control the transmission rate A serving cell of the HSDPA and a serving cell of the Enhanced Uplink are normally set to be the same cell. FIG. 4 is a diagram showing a channel connection configuration of a mobile communication system to which the HSDPA and the Enhanced Uplink are applied.

The enhanced dedicated physical control channel (E-DPCCH) transmits control data for EUL such as: transmission format numbers for determining transmission formats (transmission block size and the like) of E-DPDCH; information on HARQ (the number of retransmissions and the like); and information on scheduling (a transmission power of a mobile station UE, buffer retention amount and the like).

The enhanced dedicated physical data channel (E-DPDCH) is associated with the enhanced dedicated physical control channel (E-DPCCH), and transmits user data for a mobile station UE on the basis of control data for EUL which are transmitted on the enhanced dedicated physical control channel (E-DPCCH).

In the example of FIG. 4, unlike the case where the HSDPA is independently used, the associated dedicated physical channel (A-DPCH) does not need to transmit user data, and may only be configured to transmit control information such as pilot symbols, TPC commands and the like.

[Non-Patent Document 1] "W-CDMA Mobile Communication System", edited by Keiji Tachikawa, Maruzen Co., Ltd.

[Non-Patent Document 2] 3GPP TR25.896 v6.0.0

DISCLOSURE OF THE INVENTION

As described above, there is a problem that, when a soft handover process is performed in the conventional mobile communication system to which the HSDPA is applied, a transmission power of the high speed dedicated physical control channel (HS-DPCCH) for transmitting transmission acknowledgement signals (Ack/Nack), CQI and the like is increased, so that a communication capacity in an uplink deteriorates.

Moreover, in the above case, there is another problem that, since transmission acknowledgement signals (Ack/Nack), CQI and the like are repeatedly transmitted on the high speed dedicated physical control channel (HS-DPCCH), user throughput is caused to drop.

Further, there is another problem that, in the case where transmission diversity is applied to the above mobile communication system, a communication capacity and a throughput in a downlink deteriorate due to antenna verification error caused by the deterioration of the FBI.

When a soft handover process is not performed on an uplink in the above mobile communication system, in contrast, there is a problem that an interference power from an adjacent cell is increased, so that communication capacity in the uplink deteriorates.

Accordingly, the present invention has been made in consideration of the above-described problems and an object thereof is to provide a mobile communication system, a mobile station, and a radio base station which, when the HSDPA and the Enhancement Uplink are applied, are capable of preventing the quality of communication of a downlink from deteriorating while suppressing an interference power from an adjacent cell in an uplink.

A first aspect of the present invention is summarized as a mobile communication system, in which a mobile station is configured to transmit a transmission power reference channel and a target channel to a first cell, the mobile station is configured to transmit the target channel to a second cell, and the target channel is configured to have a transmission power offset relative to the transmission power reference channel, wherein: the first cell is configured to control a transmission power of the transmission power reference channel; and to transmit transmission rate designation information for designating a transmission rate of the target channel, to the mobile station; the second cell is configured to transmit, to the mobile station, transmission rate control information for controlling the transmission rate of the target channel; and the mobile station is configured to transmit the transmission power reference channel and the target channel, on the basis of a transmission power controlled by the first cell, and to determine the transmission rate of the target channel, on the basis of the transmission rate designation information and the transmission rate control information.

In the first aspect of the present invention, the mobile station can be configured to determine the transmission rate of the target channel, by changing the transmission rate of the target channel designated by the transmission rate designation information, on the basis of the transmission rate control information.

In the first aspect of the present invention, the mobile station can be configured to determine the transmission rate of the target channel, on the basis of a transmission acknowledgement signal of the target channel transmitted from the first cell and the second cell.

In the first aspect of the present invention, the first cell and the second cell can be provided by the same radio base station; the first cell and the second cell are each configured to control the transmission power of the transmission power reference channel transmitted from the mobile station; and the mobile station can be configured to transmit the transmission power reference channel and the target cannel to the first cell, on the basis of the transmission power controlled by the first cell, and to transmit the transmission power reference channel and the target channel to the second cell, on the basis of the transmission power controlled by the second cell.

In the first aspect of the present invention, the second cell can be configured to determine the transmission rate control information on the basis of an interference power from an adjacent cell.

In the first aspect of the present invention, the second cell can be configured to transmit the transmission rate control information, only when the transmission rate of the target channel is to be reduced.

In the first aspect of the present invention, a hard handover process between the first cell and the second cell can be performed on the transmission power reference channel; and a soft handover process between the first cell and the second cell can be performed on the target channel.

A second aspect of the present invention is summarized as a mobile station configured to transmit a transmission power reference channel and a target channel to a first cell, and to transmit the target channel to a second cell; the target channel configured to have a transmission power offset relative to the transmission power reference channel, the mobile station including: a transmission power controller unit configured to transmit the transmission power reference channel and the target channel, on the basis of a transmission power controlled by the first cell; and a transmission rate controller unit configured to determine a transmission rate of the target channel, on the basis of transmission rate designation information for designating the transmission rate of the target channel transmitted from the first cell, and transmission rate control information for controlling the transmission rate of the target channel transmitted from the second cell.

In the second aspect of the present invention, the transmission rate controller unit can be configured to determine the transmission rate of the target channel, by changing the transmission rate of the target channel designated by the transmission rate designation information, on the basis of the transmission rate control information.

In the second aspect of the present invention, the transmission rate controller unit can be configured to determine the transmission rate of the target channel, on the basis of a transmission acknowledgement signal of the target channel transmitted from the first cell and the second cell.

In the second aspect of the present invention: the first cell and the second cell can be provided by the same radio base station; and the transmission power controller unit can be configured to transmit the transmission power reference channel and the target channel to the first cell, on the basis of the transmission power controlled by the first cell, and to transmit the transmission power reference channel and the target channel to the second cell, on the basis of the transmission power controlled by the second cell.

A third aspect of the present invention is summarized as a radio base station, wherein: a transmission power reference channel and a target channel is configured to be transmitted from a mobile station to a first cell; the target channel is configured to be transmitted from the mobile station to a second cell; the target channel is configured to have a transmission power offset relative to the transmission power reference channel; the first cell is configured to control a transmission power of the transmission power reference channel, and to transmit transmission rate designation information for designating a transmission rate of the target channel to the mobile station; and the second cell is configured to transmit transmission rate control information for controlling the transmission rate of the target channel to the mobile station.

In the third aspect of the present invention, when both the first cell and the second cell are included, the first cell and the second cell can be each configured to control the transmission power of the transmission power reference channel transmitted from the mobile station.

In the third aspect of the present invention, the second cell can be configured to determine the transmission rate control information, on the basis of an interference power from an adjacent cell.

In the third aspect of the present invention, the second cell can be configured to transmit the transmission rate control information, only when transmission rate of the target channel is to be reduced.

BEST MODES FOR CARRYING OUT THE INVENTION

Figure 5:
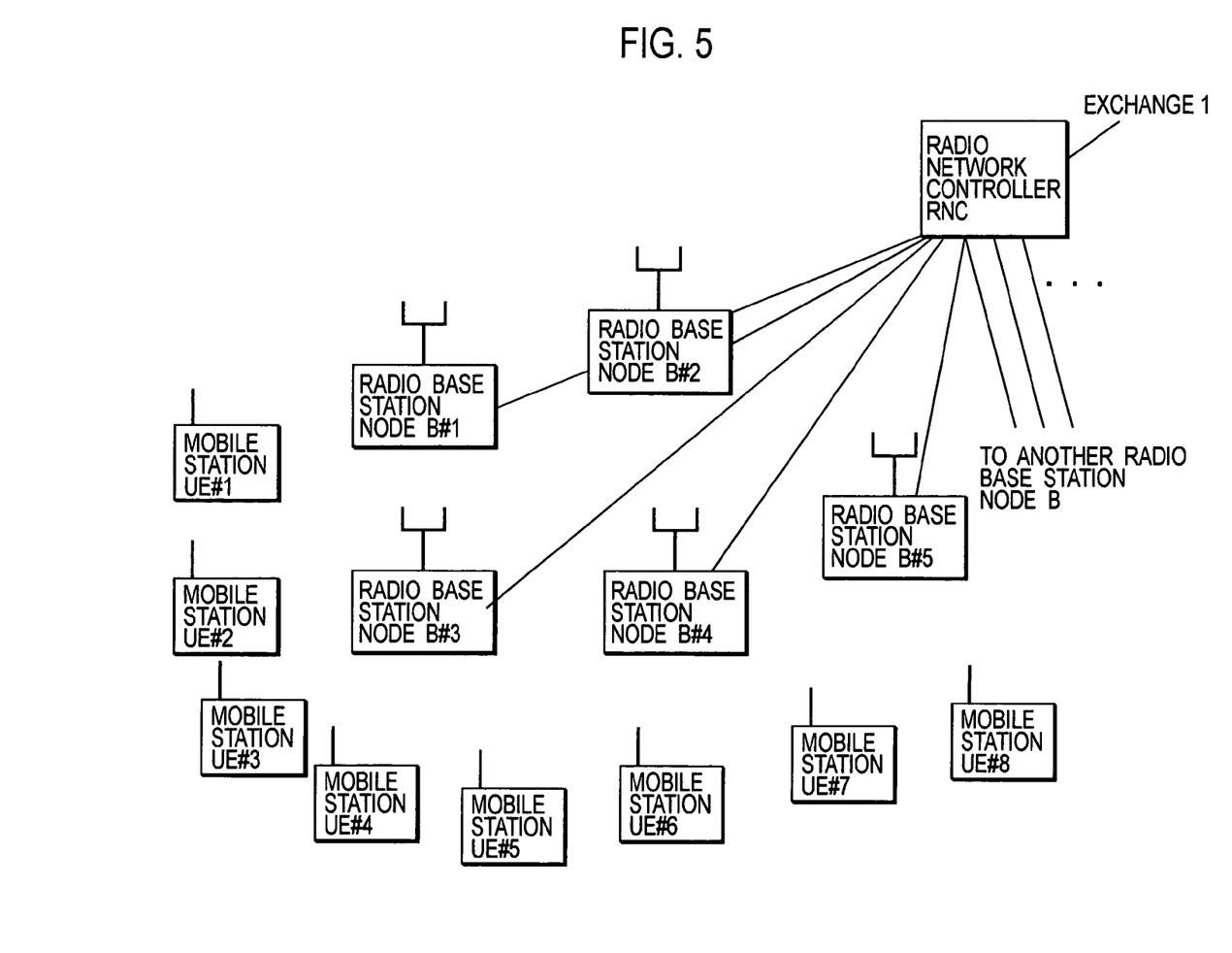
FIG. 5 is a diagram showing an entire configuration of a mobile communication system of a first embodiment of the present invention.

Configuration of Mobile Communication System of First Embodiment of Present Invention A mobile communication system of a first embodiment of the present invention is described with reference to FIGS. 5 to 10. As shown in FIG. 5, the mobile communication system of the present embodiment includes a plurality of mobile stations UE #1 to #8, a plurality of radio base stations Node B #1 to #5, and a radio network controller RNC. Further, a radio base station Node B includes a cell for communicating with the mobile stations UE. The present embodiment is hereinafter described using an example in which the radio base station Node B includes three cells.

Figure 6:
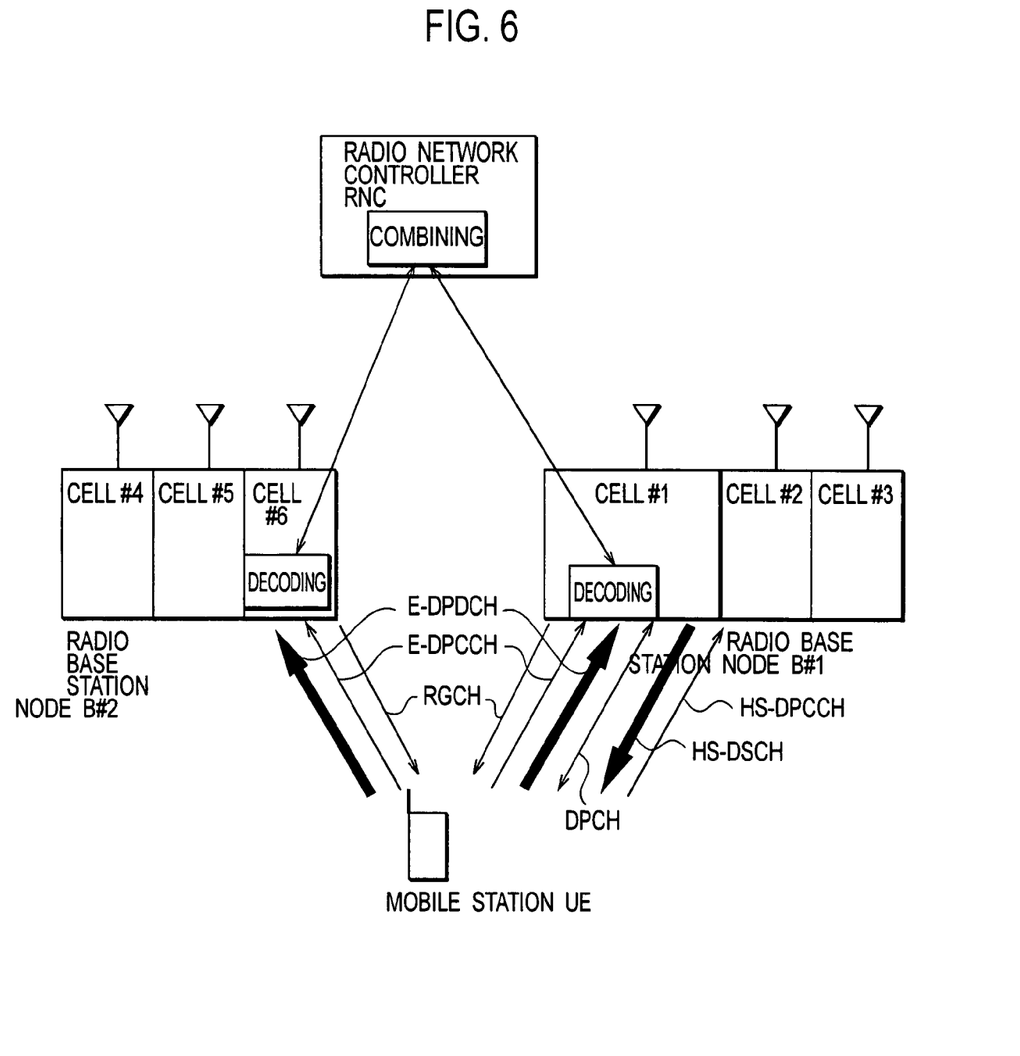
FIG. 6 is a diagram showing a connection configuration of a channel of the mobile communication system of the first embodiment of the present invention.

Further, for the sake of simplifying the description, as shown in FIG. 6, a configuration of the mobile communication system of the first embodiment of the present invention is described using an example in which a mobile station UE performs a soft handover process between a cell #1 belonging to the radio base station Node B #1 and a cell #6 belonging to radio base station Node B #2.

Here, the soft handover process indicates the setting of a radio link established between a mobile station UE and a plurality of cells (cell #1 and cell #6). In the above-described soft handover process, the cell #1 is a serving cell for the HSDPA and the Enhanced Uplink, and the cell #6 is a non-serving sell.

In the mobile communication system of the present embodiment a mobile station UE is configured to transmit, in an uplink, the following to the cell #1 (a first cell): a dedicated physical channel (DPCH) including a dedicated physical data channel (DPDCH) and a dedicated physical control channel (DPCCH, transmission power reference channel); an enhanced dedicated physical data channel (E-DPDCH, target channel); an enhanced dedicated physical control channel (E-DPCCH, target channel); and a high speed dedicated physical control channel (HS-DPCCH).

Further, in the mobile communication system of the present embodiment, the mobile station UE is configured to transmit, in an uplink, an enhanced dedicated physical data channel (E-DPDCH, target channel) and an enhanced dedicated physical control channel (E-DPCCH, target channel) to the cell #6 (a second cell).

Meanwhile, in the mobile communication system of the present embodiment, the cell #1 is configured to transmit, in a downlink, a rate grant channel (RGCH), a dedicated physical channel (DPCH), and a high speed downlink shared channel (HS-DSCH), to the mobile station UE.

Further, in the mobile communication system of the present embodiment, the cell #6 is configured to transmit, in a downlink, a rate grant channel (RGCH), to the mobile station UE.

Incidentally, in the uplink, the dedicated physical data channel (DPDCH), the enhanced dedicated physical control channel (E-DPCCH), the enhanced dedicated physical data channel (E-DPDCH), and the high speed dedicated physical control channel (HS-DPCCH) are configured to have a transmission power offset relative to the dedicated physical control channel (DPCCH).

Still further, in the downlink, the dedicated physical data channel (DPDCH) and the high speed downlink shared channel (HS-DSCH) are configured to have a transmission power offset relative to the dedicated physical control channel (DPCCH).

In an example shown in FIG. 6, the cell #1 (serving cell) and the cell #6 (non-serving cell) is configured to decode the enhanced dedicated physical control channel (E-DPCCH) and the enhanced dedicated physical data channel (E-DPDCH), and the radio network controller RNC is configured to perform the selective combining On the other hand, only the cell #1 (serving cell) is configured to perform a transmission power control process on the dedicated physical channel (DPCH). Here, the cell #6 (non-serving cell) does not perform a transmission/reception process of the dedicated physical channel (DPCH).

The high speed downlink shared channel (HS-DSCH) is transmitted to the mobile station UE only from the cell #1 (serving cell).

In addition, the mobile station UE transmits the high speed dedicated physical control channel (HS-DPCCH) only to the cell #1, using a transmission power obtained by adding a predetermined transmission power offset (a gain factor) relative to the dedicated physical control channel (DPCCH) performing a transmission power control process between the cell #1 and itself.

On the other hand, the enhanced dedicated physical control channel (E-DPCCH) and the enhanced dedicated physical data channel (E-DPDCH) are received by both the cell #1 and the cell #6 which are targets for soft handover process.

As described above, the present embodiment is configured to perform a hard handover process on the dedicated physical channel (DPCH), between the cell #1 and the cell #6, and to perform a soft handover process on the enhanced dedicated physical channel (E-DPCH), between the cell #1 and the cell #6.

Figure 7:
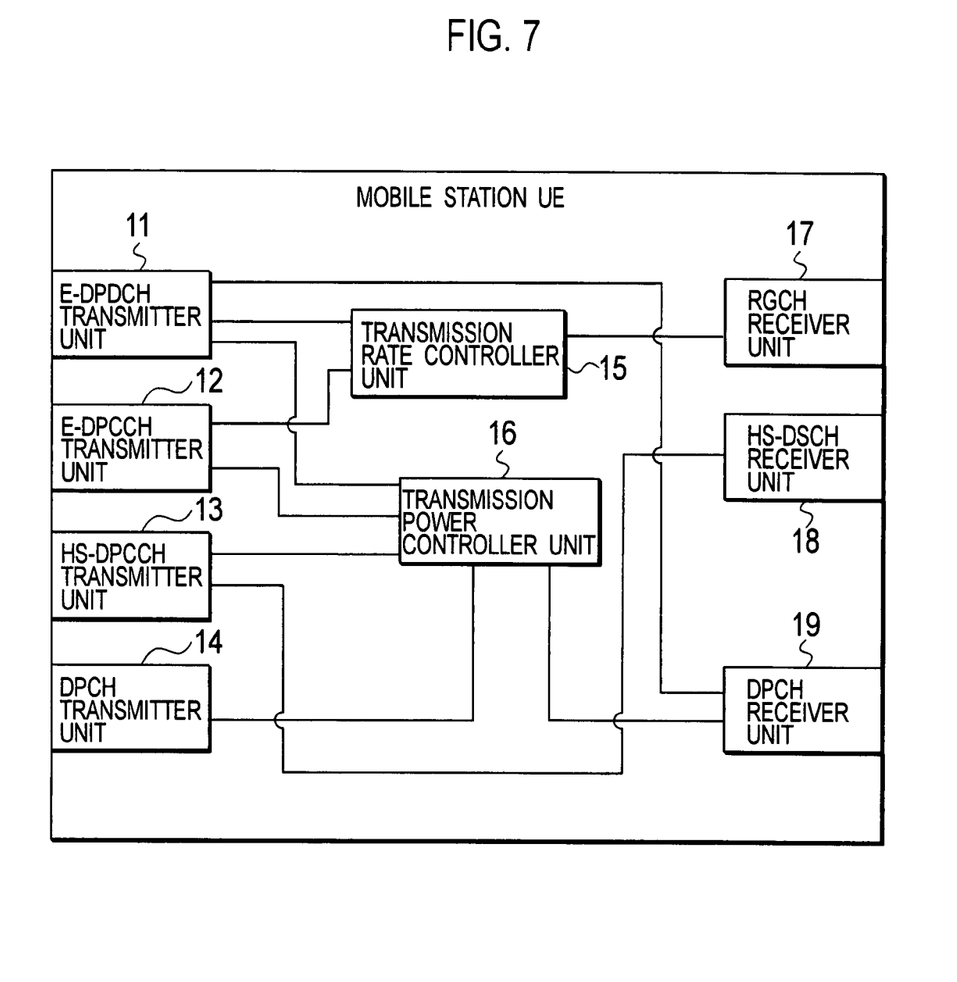
FIG. 7 is a functional block diagram for a mobile station of the mobile communication system of the first embodiment of the present invention.

As shown in FIG. 7, the mobile station UE of the present embodiment includes: an E-DPDCH transmitter unit 11; an E-DPCCH transmitter unit 12; an HS-DPCCH transmitter unit 13; a DPCH transmitter unit 14; a transmission rate controller unit 15; an RGCH receiver unit 17; an HS-DSCH receiver unit 18; and a DPCH receiver unit 19.

The E-DPDCH transmitter unit 11 is configured to transmit an enhanced dedicated physical data channel (E-DPDCH) for transmitting user data, to the cell #1 and the cell #6 which are targets for soft handover process, using a transmission power (that is, a transmission power controlled by a serving cell (cell #1)) instructed by the transmission power controller unit 16.

For example, the E-DPDCH transmitter unit 11 transmits the enhanced dedicated physical data channel (E-DPDCH) using a transmission power obtained by adding a predetermined transmission power offset (E-DPDCH power offset) relative to a transmission power of the dedicated physical control channel (DPCCH).

Further, the E-DPDCH transmitter unit 11 is configured to transmit the enhanced dedicated physical data channel (E-DPDCH) at a transmission rate determined by the transmission rate controller unit 15.

In the present embodiment, the transmission rate of the enhanced dedicated physical channel (E-DPCH) determined by the transmission rate controller unit 15 is a concept which includes a transmission data block size, "a transmission power ratio between an enhanced dedicated physical data channel (E-DPDCH) and an enhanced dedicated physical control channel (E-DPCCH)" and the like, in addition to the transmission rate of the enhanced dedicated physical channel (E-DPCH) itself (hereinbelow, similar terms indicate the same concept).

The E-DPCCH transmitter unit 12 is configured to transmit an enhanced dedicated physical control channel (E-DPCCH) for transmitting control data for Enhanced Uplink, to the cell #1 and the cell #6 which are targets for soft handover process, using a transmission power (that is, a transmission power controlled by a serving cell (cell #1)) instructed by the transmission power controller unit 16.

For example, the E-DPDCH transmitter unit 12 transmits the enhanced dedicated physical control channel (E-DPCCH) using a transmission power obtained by adding a predetermined transmission power offset (E-DPCCH power offset) relative to a transmission power of the dedicated physical control channel (DPCCH).

Further, the E-DPCCH transmitter unit 12 is configured to transmit the enhanced dedicated physical control channel (E-DPCCH) at a transmission rate determined by the transmission rate controller unit 15.

The HS-DPCCH transmitter unit 13 is configured to transmit the high speed dedicated physical control channel (HS-DPCCH) for transmitting control data for HSDPA, only to the cell #1, using a transmission power (that is, a transmission power controlled by a serving cell (cell #1)) instructed by the transmission power controller unit 16.

For example, the HS-DPCCH transmitter unit 13 transmits the high speed dedicated physical control channel (HS-DPCCH) using a transmission power obtained by adding a predetermined transmission power offset (HS-DPCCH power offset) relative to a transmission power of the dedicated physical control channel (DPCCH).

The DPCH transmitter unit 14 is configured to transmit a dedicated physical channel (DPCH) for transmitting control data, only to the cell #1 (serving cell) using a transmission power (that is, a transmission power controlled by a serving cell (cell #1)) instructed by the transmission power controller unit 16.

For example, the DPCH transmitter unit 14 transmits a dedicated physical data channel (DPDCH) using a transmission power obtained by adding a predetermined transmission power offset (DPDCH power offset) relative to a transmission power of the dedicated physical control channel (DPCCH).

Further, the DPCH transmitter unit 14 transmits the dedicated physical control channel (DPCCH) using a transmission power determined by a closed loop transmission power control process between the cell #1 and the DPCH transmitter unit 14 itself.

The transmission rate controller unit 15 is configured to determine a transmission rate (a transmission rate itself, a transmission data block size, the above-described transmission power ratio, or the like) of the enhanced dedicated physical channel (E-DPCH), on the basis of transmission rate designation information transmitted from the cell #1 (serving cell) and transmission rate control information transmitted from the cell #6 (non-serving cell).

Here, the transmission rate designation information instructs a transmission rate of the enhanced dedicated physical channel (E-DPCH) which includes the transmission rate itself of the enhanced dedicated physical channel (E-DPCH, target channel), the transmission data block size, the above-described transmission power ratio, and the like.

For example, the transmission rate designation information instructs: a transmission rate (an absolute value) of the enhanced dedicated physical channel (E-DPCH); a parameter for calculating the transmission rate (an absolute value); an increase/decrease instruction command ("UP", "Hold" or "Down" command) to the present transmission rate or parameter; a ratio (%) to the present transmission rate or parameter; and the like.

Further, the transmission rate control information is information to complement a transmission rate control process by the transmission rate designation information, and gives notice of, for example, a decrease instruction command ("Down" command) to the transmission rate or the parameter instructed by the transmission rate designation information, a ratio (%) to the aforementioned transmission rate or the parameter, and the like.

First, when a transmission rate (or a parameter to calculate the transmission rate) is instructed by the transmission rate designation information, the transmission rate controller unit 15 sets the transmission rate of the enhanced dedicated physical channel (E-DPCH) to this transmission rate (the transmission rate calculated using the parameter).

Alternatively, when an increase/decrease instruction command (or a ratio relative to the present transmission rate or the parameter) to the present transmission rate or the parameter is instructed by the transmission rate designation information, the transmission rate controller unit 15 changes the present transmission rate or the parameter of the enhanced dedicated physical channel (E-DPCH), in accordance to the increase/decrease instruction command (or the ratio relative to the present transmission rate or the parameter) to the present transmission rate or the parameter.

Thereafter, the transmission rate controller unit 15 changes the transmission rate set by the transmission rate designation information, on the basis of transmission rate control information.

Still further, the transmission rate controller unit 15 may be configured to determine the transmission rate of the enhanced dedicated physical channel (E-DPCH), on the basis of a transmission acknowledgement signal (Ack/Nack) concerning the enhanced dedicated physical channel (E-DPCH) transmitted from the cell #1 (serving cell) and the cell #6 (non-serving cell).

The transmission power controller unit 16 performs a closed loop transmission power control process between itself and the cell #1 (serving cell), and, thereby, determines the transmission power of the dedicated physical control channel (DPCCH).

Further, the transmission power controller unit 16 is configured to calculate a transmission power offset of each channel relative to the determined transmission power of the dedicated physical control channel (DPCCH).

The RGCH receiver unit 17 is configured to receive rate grant channels (RGCH) transmitted from the cell #1 (serving cell) and the cell #6 (non-serving cell). Incidentally, the rate grant channel (RGCH) is configured to transmit the above-described transmission rate control information and the transmission rate designation information.

The HS-DSCH receiver unit 18 is configured to receive the high speed downlink shared channel (HS-DSCH) transmitted from the cell #1 (serving cell). The DPCH receiver unit 19 is configured to receive the dedicated physical channel (DPCH) transmitted from the cell #1 (serving cell).

Figure 8:
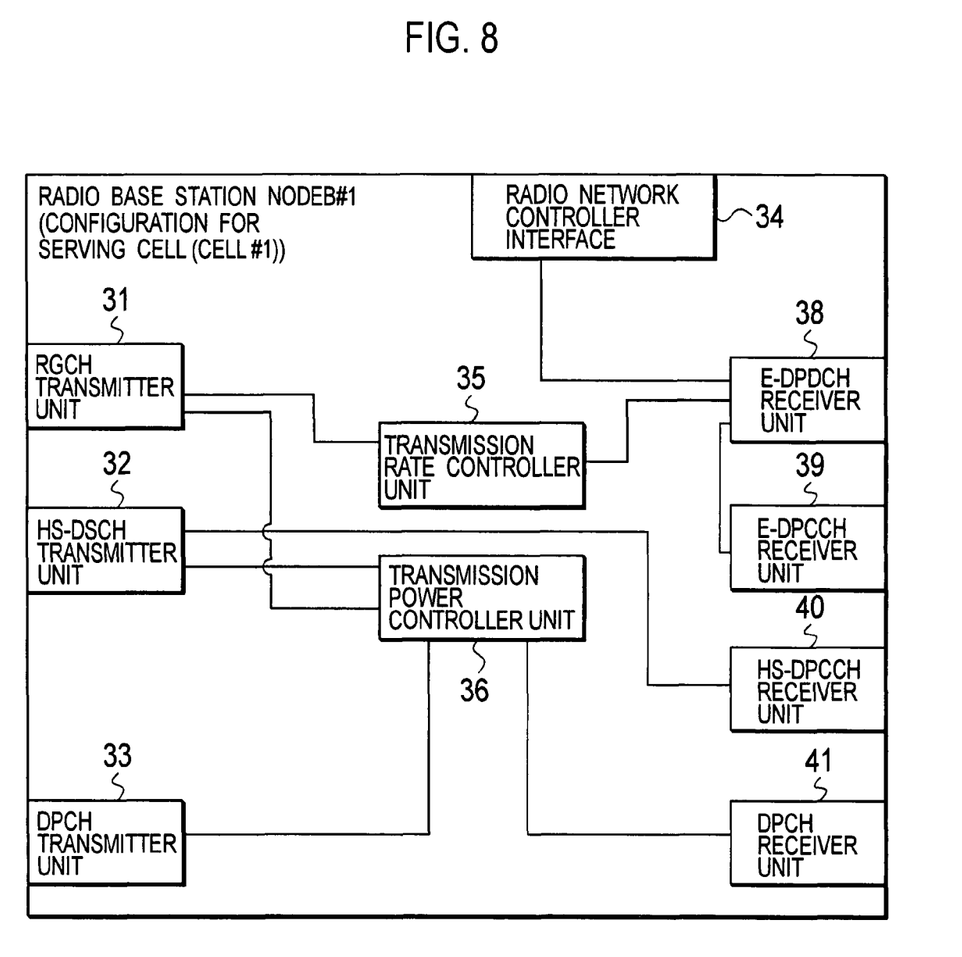
FIG. 8 is a functional block diagram for a radio base station (configuration for a serving cell) of the mobile communication system of the first embodiment of the present invention.

As shown in FIG. 8, a configuration of a serving cell (cell #1) of a radio base station Node B includes: an RGCH transmitter unit 31; an HS-DSCH transmitter unit 32; a DPCH transmitter unit 33; a radio network controller interface 34; a transmission rate controller unit 35; a transmission power controller unit 36; an E-DPDCH receiver unit 38; an E-DPCCH receiver unit 39; an HS-DPCCH receiver unit 40; and a DPCH receiver unit 41.

The RGCH transmitter unit 31 is configured to transmit a rate grant channel (RGCH) including transmission rate designation information instructed by the transmission rate controller unit 35, to the mobile station UE, using a transmission power instructed by the transmission power controller unit 36.

Further, the RGCH transmitter unit 31 may be configured to transmit a rate grant channel (RGCH) including a transmission acknowledgement signal concerning the enhanced dedicated physical channel (E-DPCH).

The HS-DSCH transmitter unit 32 is configured to transmit a high speed downlink shared channel (HS-DSCH) including user data for HSDPA, to the mobile station UE, using a transmission power instructed by the transmission power controller unit 36.

The DPCH transmitter unit 33 is configured to transmit the dedicated physical channel (DPCH) including a TPC command and the like, to the mobile station UE, using a transmission power instructed by the transmission power controller unit 36.

When the enhanced dedicated physical data channel (E-DPDCH) is correctly received and decoded, the radio network controller interface 34 is configured to transmit the enhanced dedicated physical data channel (E-DPDCH) to a radio network controller RNC.

The transmission rate controller unit 35 is configured to generate, by using a predetermined control method (for example, a method shown in FIG. 3), transmission rate designation information for controlling the transmission rate of an enhanced dedicated physical channel (E-DPCH) of the mobile station UE. Further, the transmission rate controller unit 35 is configured to perform a transmission rate control process of the enhanced dedicated physical channel (E-DPCH) of the mobile station UE independently of the transmission rate control process by a non-serving cell (cell #6).

The transmission power controller unit 36 is configured to perform a closed loop transmission power control process between itself and the mobile station UE, and, thereby, to determine the transmission power of the dedicated physical control channel (DPCCH).

The E-DPDCH receiver unit 38 is configured to receive an enhanced dedicated physical data channel (E-DPDCH) transmitted from the mobile station UE. The E-DPCCH receiver unit 39 is configured to receive an enhanced dedicated physical control channel (E-DPCCH) transmitted from the mobile station UE. The HS-DPCCH receiver unit 40 is configured to receive a high speed dedicated physical control channel (HS-DPCCH) transmitted from the mobile station UE. The DPCH receiver unit 41 is configured to receive a dedicated physical channel (DPCH) transmitted from the mobile station UE.

Figure 9:
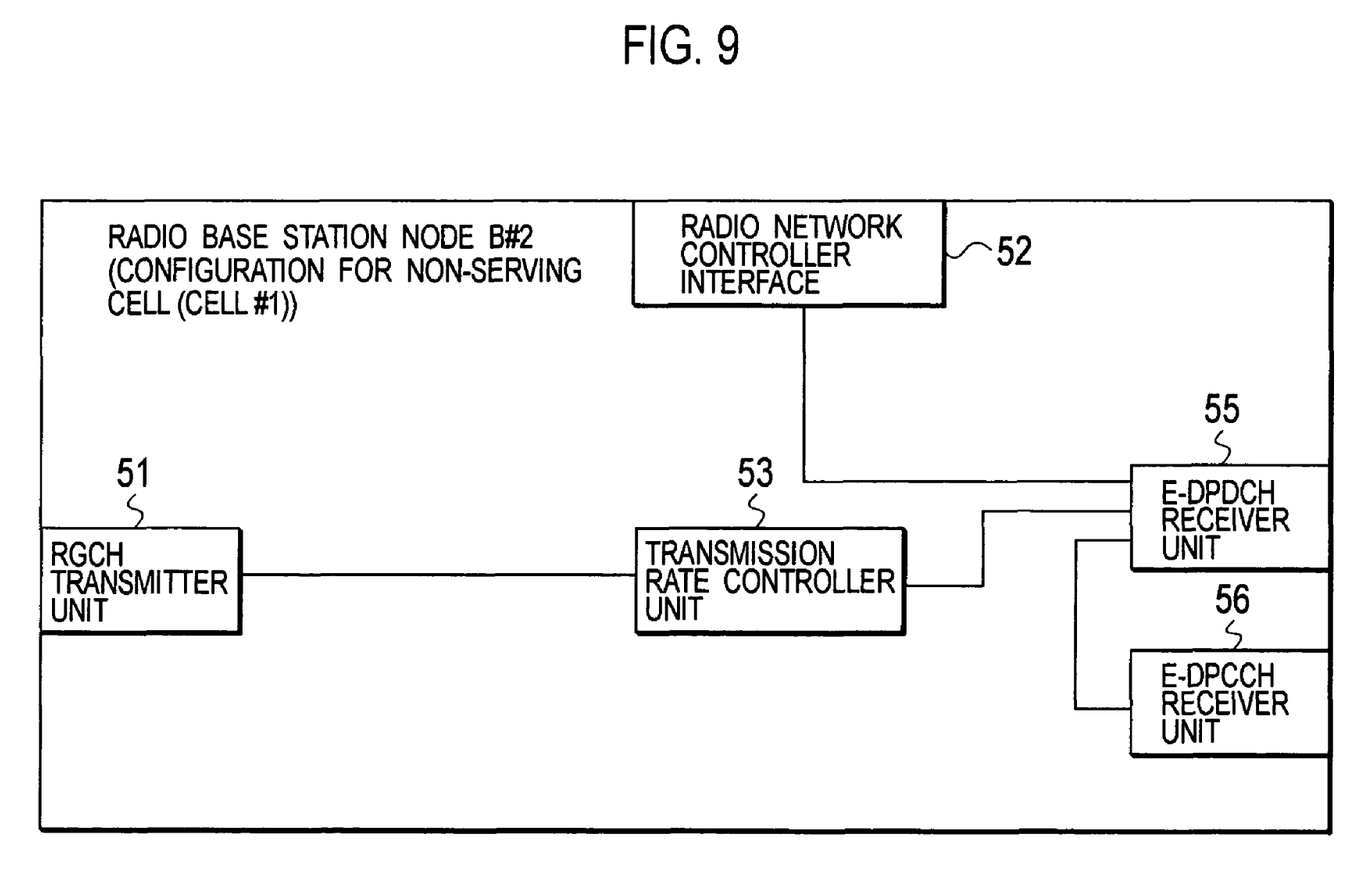
FIG. 9 is a functional block diagram for a radio base station (configuration for a non-serving cell) of the mobile communication system of the first embodiment of the present invention.

As shown in FIG. 9, a configuration for non-serving cell (cell #6) of the radio base station Node B includes: an RGCH transmitter unit 51; a radio network controller interface 52; a transmission rate controller unit 53; an E-DPDCH receiver unit 55; and an E-DPCCH receiver unit 56.

The RGCH transmitter unit 51 is configured to transmit a rate grant channel (RGCH) including transmission rate control information generated by the transmission rate controller unit 53, to a mobile station UE, using a transmission power instructed by the transmission power controller unit 53.

The RGCH transmitter unit 51 may be configured to transmit the rate grant channel (RGCH) including the transmission rate control information, only when reducing the transmission rate of an enhanced dedicated physical channel (E-DPCH) in the mobile station UE.

Moreover, The RGCH transmitter unit 51 may be configured to transmit the rate grant channel (RGCH) including a transmission acknowledgement signal concerning the enhanced dedicated physical channel (E-DPCH).

The radio network controller interface 52 is configured to transmit the enhanced dedicated physical data channel (E-DPDCH) to a radio network controller RNC, when the enhanced dedicated physical data channel (E-DPDCH) is correctly received and decoded.

The transmission rate controller unit 53 is configured to generate transmission rate control information for controlling the transmission rate of the enhanced dedicated physical channel (E-DPCH), on the basis of an interference power from an adjacent cell.

For example, when the interference power from an adjacent cell is increased, the transmission rate controller unit 53 generates transmission rate control information for instructing the mobile station UE to reduce the transmission rate designated by the cell #1 (serving-cell).

However, such transmission rate control information cannot instruct a transmission rate greater than that designated by the cell #1 (serving cell).

The E-DPDCH receiver unit 55 is configured to receive an enhanced dedicated physical data channel (E-DPDCH) transmitted from the mobile station UE. The E-DPCCH receiver unit 56 is configured to receive an enhanced dedicated physical control channel (E-DPCCH) transmitted from the mobile station UE.

Operation and Effect of Mobile Communication System of First Embodiment of Present Invention According to the mobile communication system of the first embodiment of the present invention, a dedicated physical channel (DPCH), a high speed dedicated physical control channel (HS-DPCCH), and an enhanced dedicated physical control channel (E-DPCCH) are made to follow only a TPC bit of a serving cell (cell #1), whereby the communication quality of the high speed dedicated physical control channel (HS-DPCCH) can be secured. Consequently, deterioration in the throughput of the HSDPA can be prevented. Moreover, as a result, the antenna verification errors due to the deterioration of the FBI bit can be reduced so that the deterioration in the communication quality of a downlink can be prevented.

Further, according to the mobile communication system of the first embodiment of the present invention, when the received power of the enhanced dedicated physical data channel (E-DPDCH) that the non-serving cell (cell #6) has received is large, the non-serving cell (cell #6) can instruct the mobile station UE to reduce the transmission rate of the enhanced dedicated physical data channel (E-DPDCH). Thus, the interference power from an adjacent cell can be reduced.

Further, according to the mobile communication system of the first embodiment of the present invention, a hard handover process is substantially performed on the dedicated physical channel (DPCH). However, considering that user data of an uplink are associated with the enhanced dedicated physical data channel (E-DPDCH), the dedicated physical channel (DPCH) for an uplink is a narrow channel with which a layer 3 control signal is associated, and thereby the interference power between adjacent cells is not so large.

In other words, according to the mobile communication system of the first embodiment of the present invention, a transmission power control process corresponding to a hard handover process is performed on the dedicated physical channel (DPCH) and the high speed dedicated physical control channel (HS-DPCCH). Meanwhile, a soft handover process is performed on the enhanced dedicated physical channel (HS-DPCH). As a result, an increase in the throughput of the downlink is achieved by the HSDPA while reducing compression on communication capacity of an uplink due to the hard handover process.

Modified Embodiment

Figure 10:
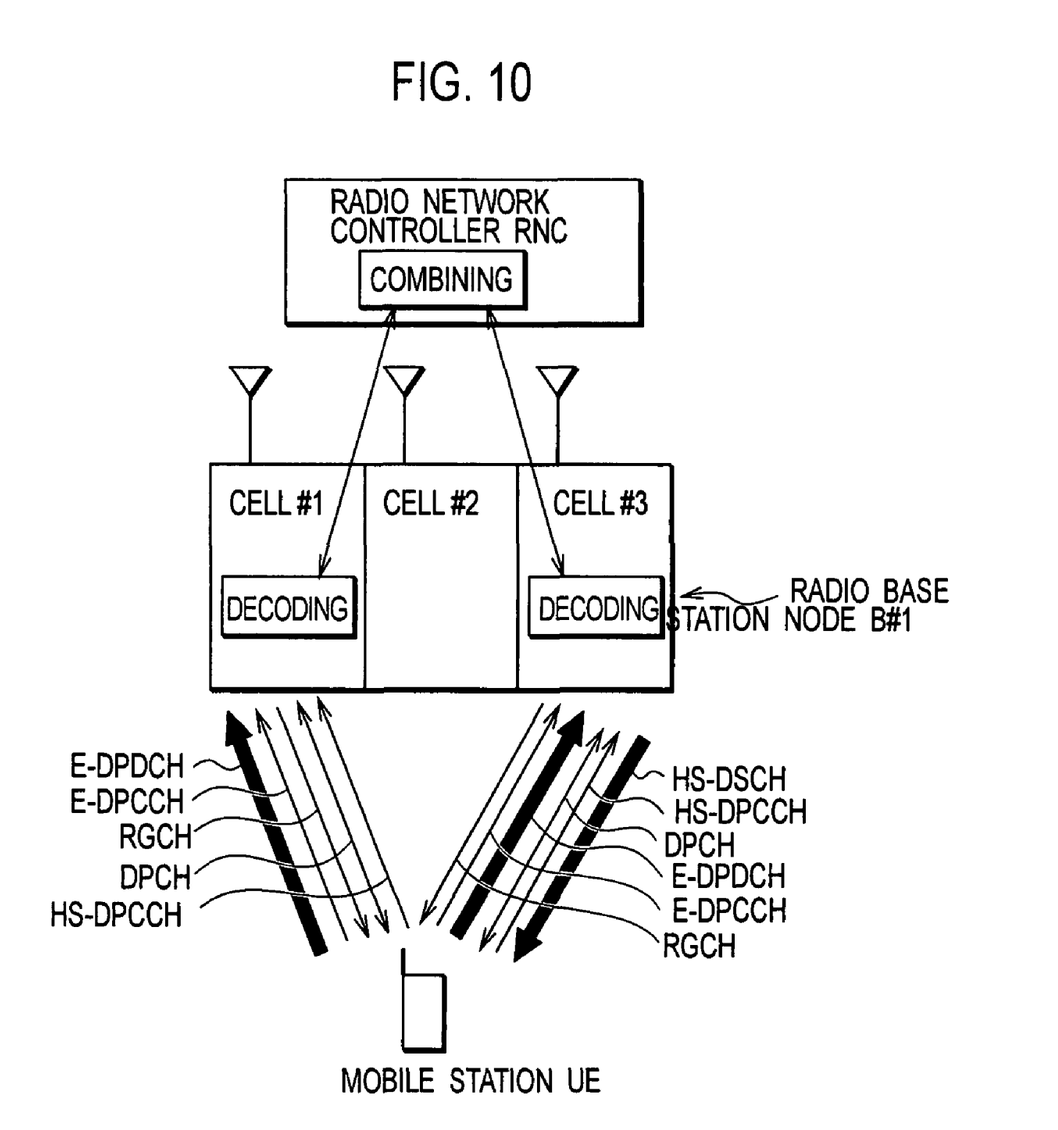
FIG. 10 is a diagram showing a connection configuration of a channel of a mobile communication system of a modified embodiment 1 of the present invention.

A mobile communication system of a first modified embodiment of the present invention will be described with reference to FIG. 10. As shown in FIG. 10, in the mobile communication system of the modified embodiment 1, a serving cell (cell #1) and a non-serving cell (cell #3) are provided to the same radio base station Node B #1.

That is, in the mobile communication system of the modified embodiment 1 of the present invention, cells (cell #2 and cell #3) belonging to the same radio base station as the serving cell (cell #1) are referred to as a "serving cell set".

The serving cell set can have the same connection configuration of channels as the serving cell (cell #1). However, only the serving cell (cell #1) in the serving cell set transmits the high speed downlink shared channel (HS-DSCH) to the mobile station UE.

That is, the cells #1 to #3 are configured to each control a transmission power of the dedicated physical channel (DPCH) transmitted from the mobile station UE.

According to the mobile communication system of the present modified embodiment, since a inter-cell diversity within a radio base station Node B can be performed, a communication capacity in an uplink can be increased.

Additionally, according to the mobile communication system of the present modified embodiment, in the radio base station Node B, since a soft combining can be performed on data transmitted on a channel in an uplink, a deterioration can be avoided in the high speed dedicated physical control channel (HS-DPCCH) and the FBI bit.

INDUSTRIAL APPLICABILITY

As described above, according to the present invention, a mobile communication system, a mobile station, and a radio base station can be provided, which, when the HSDPA and an Enhanced Uplink are applied, are capable of preventing the communication quality in a downlink from being deteriorated while suppressing the interference power from an adjacent cell in an uplink.

The invention claimed is:

1. A mobile communication system, in which a mobile station is configured to transmit a dedicated physical control channel (DPCCH) and an enhanced dedicated physical data channel (E-DPDCH) to a first cell, the mobile station is configured to transmit the enhanced dedicated physical data channel to a second cell, and the enhanced dedicated physical data channel is configured to have a transmission power offset relative to the dedicated physical control channel, wherein:

the first cell is configured to control a transmission power of the dedicated physical control channel; and to transmit transmission rate designation information for designating a transmission rate of the enhanced dedicated physical data channel, to the mobile station;

the second cell is configured not to control the transmission power of the dedicated physical control channel, and to transmit, to the mobile station, transmission rate control information for controlling the transmission rate of the enhanced dedicated physical data channel;

the mobile station is configured to transmit the dedicated physical control channel and the enhanced dedicated physical data channel, on the basis of a transmission power controlled by the first cell, and to determine the transmission rate of the enhanced dedicated physical data channel, on the basis of the transmission rate designation information and the transmission rate control information;

a hard hand over is performed for the dedicated physical control channel; and a soft handover is performed for the enhanced dedicated physical data channel.

2. The mobile communication system according to claim 1, wherein the mobile station is configured to determine the transmission rate of the enhanced dedicated physical data channel, by changing the transmission rate of the enhanced dedicated physical data channel designated by the transmission rate designation information, on the basis of the transmission rate control information.

3. The mobile communication system according to claim 1, wherein the mobile station is configured to determine the transmission rate of the enhanced dedicated physical data channel, on the basis of a transmission acknowledgement signal of the enhanced dedicated physical data channel transmitted from the first cell and the second cell.

4. The mobile communication system according to claim 1, wherein the first cell and the second cell are provided by the same radio base station;

the first cell and the second cell are each configured to control the transmission power of the dedicated physical control channel transmitted from the mobile station; and the mobile station is configured to transmit the dedicated physical control channel and the enhanced dedicated physical data channel to the first cell, on the basis of the transmission power controlled by the first cell, and to transmit the dedicated physical control channel and the enhanced dedicated physical data channel to the second cell, on the basis of the transmission power controlled by the second cell.

5. The mobile communication system according to claim 1, wherein the second cell is configured to determine the transmission rate control information on the basis of an interference power from an adjacent cell.

6. The mobile communication system according to claim 1, wherein the second cell is configured to transmit the transmission rate control information, only when the transmission rate of the enhanced dedicated physical data channel is to be reduced.

7. The mobile communication system according to claim 1, wherein a hard handover process between the first cell and the second cell is performed on the dedicated physical control channel; and a soft handover process between the first cell and the second cell is performed on the enhanced dedicated physical data channel.

8. A mobile station configured to transmit a dedicated physical control channel and an enhanced dedicated physical data channel to a first cell, and to transmit the enhanced dedicated physical data channel to a second cell; the enhanced dedicated physical data channel configured to have a transmission power offset relative to the dedicated physical control channel, the mobile station comprising:

a transmission power controller unit configured to transmit the dedicated physical control channel and the enhanced dedicated physical data channel, on the basis of a transmission power controlled by the first cell without being controlled by the second cell;

a transmission rate controller unit configured to determine a transmission rate of the enhanced dedicated physical data channel, on the basis of transmission rate designation information for designating the transmission rate of the enhanced dedicated physical data channel transmitted from the first cell, and transmission rate control information for controlling the transmission rate of the enhanced dedicated physical data channel transmitted from the second cell;

a hard hand over is performed for the dedicated physical control channel; and a soft handover is performed for the enhanced dedicated physical data channel.

9. The mobile station according to claim 8, wherein the transmission rate controller unit is configured to determine the transmission rate of the enhanced dedicated physical data channel, by changing the transmission rate of the enhanced dedicated physical data channel designated by the transmission rate designation information, on the basis of the transmission rate control information.

10. The mobile station according to claim 8, wherein the transmission rate controller unit is configured to determine the transmission rate of the enhanced dedicated physical data channel, on the basis of a transmission acknowledgement signal of the enhanced dedicated physical data channel transmitted from the first cell and the second cell.

11. The mobile station according to claim 8, wherein:

the first cell and the second cell are provided by the same radio base station; and the transmission power controller unit is configured to transmit the dedicated physical control channel and the enhanced dedicated physical data channel to the first cell, on the basis of the transmission power controlled by the first cell, and to transmit the dedicated physical control channel and the enhanced dedicated physical data channel to the second cell, on the basis of the transmission power controlled by the second cell.

12. A radio base station in communication with a mobile station via a first cell and a second cell, the mobile station transmitting via the first cell a dedicated physical control channel and an enhanced dedicated physical data channel, and transmitting via the second cell the enhanced dedicated physical data channel, wherein the enhanced dedicated physical data channel has a transmission power offset relative to the dedicated physical control channel, the radio base station comprising:

serving cell circuitry configured to control a transmission power of the dedicated physical control channel in the first cell, and to transmit transmission rate designation information for designating a transmission rate of the enhanced dedicated physical data channel to the mobile station in the first cell;

non-serving cell circuitry configured not to control the transmission power of the dedicated physical control channel, and to transmit transmission rate control information for controlling the transmission rate of the enhanced dedicated physical data channel to the mobile station in the second cell; and circuitry to perform a hard hand over for the dedicated physical control channel and a soft handover for the enhanced dedicated physical data channel.

13. The radio base station according to claim 12, wherein, the serving cell circuitry and the non-serving cell circuitry are each configured to control the transmission power of the dedicated physical control channel transmitted from the mobile station when the radio base station serves both the first cell and the second cell.

14. The radio base station according to claim 12, wherein the non-serving cell circuitry is configured to determine the transmission rate control information on the basis of an interference power from an adjacent cell.

15. The radio base station according to claim 12, wherein the non-serving cell circuitry is configured to transmit the transmission rate control information only when transmission rate of the enhanced dedicated physical data channel is reduced.

* * * * *